US010965696B1

(12) United States Patent
Amram et al.

(10) Patent No.: US 10,965,696 B1
(45) Date of Patent: Mar. 30, 2021

(54) EVALUATION OF ANOMALY DETECTION ALGORITHMS USING IMPERSONATION DATA DERIVED FROM USER DATA

(71) Applicant: EMC IP Holding Company LLC, Hopkinton, MA (US)

(72) Inventors: Shay Amram, Holon (IL); Alex Zaslavsky, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 257 days.

(21) Appl. No.: 15/797,065

(22) Filed: Oct. 30, 2017

(51) Int. Cl.
*H04L 29/06* (2006.01)
*G06N 20/00* (2019.01)
*G06Q 10/06* (2012.01)

(52) U.S. Cl.
CPC ......... *H04L 63/1425* (2013.01); *G06N 20/00* (2019.01); *H04L 63/1416* (2013.01); *G06Q 10/0635* (2013.01)

(58) Field of Classification Search
CPC ............. H04L 63/1483; H04L 63/1491; H04L 63/1416; H04L 63/1425
See application file for complete search history.

(56) References Cited

U.S. PATENT DOCUMENTS

| | | | |
|---|---|---|---|
| 8,484,744 B1* | 7/2013 | De .................... | G06F 21/6245 726/26 |
| 2002/0087882 A1* | 7/2002 | Schneier ............. | H04L 63/20 726/23 |
| 2006/0191010 A1* | 8/2006 | Benjamin ........... | H04L 63/1433 726/23 |
| 2009/0320137 A1* | 12/2009 | White ................. | H04L 63/1433 726/25 |
| 2011/0167494 A1* | 7/2011 | Bowen ................ | G06F 21/566 726/24 |

(Continued)

OTHER PUBLICATIONS

Amir Herzberg et al., Security and Identification Indicators for Browsers against Spoofing and Phishing Attacks, Oct. 2008, ACM, pp. 1-36. (Year: 2008).*

(Continued)

*Primary Examiner* — Luu T Pham
*Assistant Examiner* — Fahimeh Mohammadi
(74) *Attorney, Agent, or Firm* — Ryan, Mason & Lewis, LLP

(57) ABSTRACT

Techniques are provided for evaluating anomaly detection algorithms using impersonation data derived from user transaction data. An exemplary method comprises obtaining transaction data of a given enterprise organization comprising transactions of a plurality of users; generating impersonation data by modifying one or more features of a subset of the transaction data of the given enterprise organization; classifying (i) at least a portion of the transaction data of the given enterprise organization, and (ii) at least a portion of the impersonation data using the anomaly detection algorithm of the given enterprise organization, wherein records of the impersonation data comprise a known classification; and evaluating a performance of the anomaly detection algorithm of the given enterprise organization by comparing the classification of records of the impersonation data by the anomaly detection algorithm with the known classification.

20 Claims, 6 Drawing Sheets

(56) References Cited

U.S. PATENT DOCUMENTS

| | | | |
|---|---|---|---|
| 2011/0167495 A1* | 7/2011 | Antonakakis | G06F 9/45508 726/24 |
| 2013/0227697 A1* | 8/2013 | Zandani | G06F 21/57 726/25 |
| 2016/0012222 A1* | 1/2016 | Stolfo | G06F 21/554 726/23 |
| 2016/0134653 A1* | 5/2016 | Vallone | H04L 41/046 726/25 |
| 2016/0205122 A1* | 7/2016 | Bassett | G06F 21/577 726/23 |
| 2016/0210631 A1* | 7/2016 | Ramasubramanian | G06Q 20/4016 |
| 2017/0061322 A1* | 3/2017 | Chari | G06F 21/554 |
| 2017/0230418 A1* | 8/2017 | Amar | H04L 63/08 |
| 2018/0033009 A1* | 2/2018 | Goldman | G06Q 20/4016 |
| 2019/0028509 A1* | 1/2019 | Cidon | G06F 21/552 |
| 2019/0215328 A1* | 7/2019 | Honig | H04L 63/1425 |
| 2019/0222605 A1* | 7/2019 | Key | H04L 63/02 |

OTHER PUBLICATIONS

Viktor Krammer, Phishing Defense against IDN Address Spoofing Attacks, Oct. 2006, ACM, pp. 1-9. (Year: 2006).*

Muhamad Erza Aminanto et al., Deep Abstraction and Weighted Feature Selection for Wi-Fi Impersonation Detection, Oct. 13, 2017, IEEE, pp. 621-636. (Year: 2017).*

Jiawei Yuan et al., Public Integrity Auditing for Dynamic Data Sharing With Multiuser Modification, Apr. 15, 2015, IEEE, vol. 10, Issue: 8, pp. 1717-1726. (Year: 2015).*

* cited by examiner

USER TRANSACTION RECORDS 200

| USER-ID | TIME | TRANSACTION |
|---|---|---|
| ALICE | 10:00 | NORMAL |
| ALICE | 12:34 | NORMAL |
| ALICE | 15:03 | NORMAL |
| ALICE | 15:58 | NORMAL |
| ALICE* | 16:11 | INJECTED (USER-ID MODIFIED TO A) |

FIG. 2

SUPERVISED-LEARNING LAYER PROCESS 600:

1. APPLY APPROPRIATE SUPERVISED LEARNING ALGORITHM TO DATASET

2. DETECT $d$ FEATURES THAT WORK WELL WITH SUPERVISED ALGORITHM

3. USE SUPERVISED ALGORITHM TO CLASSIFY NEW TEST DATASET, USING DETECTED $d$ FEATURES

4. CHALLENGE TRANSACTION(S) PREDICTED TO BE IMPERSONATION

5. EVALUATE OTHER TRANSACTIONS (PREDICTED TO BE BENIGN) USING SCORE OF ANOMALY DETECTION ENGINE

6. CHALLENGE TOP-N RISKIEST TRANSACTIONS BASED ON ANOMALY DETECTION SCORE

FIG. 6

EVALUATION OF ANOMALY DETECTION ALGORITHMS USING IMPERSONATION DATA DERIVED FROM USER DATA

FIELD

The field relates generally to information processing systems, and more particularly to the evaluation of anomaly detection systems using impersonation data.

BACKGROUND

Anomaly detection systems detect anomalous activity within an enterprise network using Machine Learning (ML) techniques, such as supervised and semi-supervised learning techniques. Supervised learning techniques process labeled or classified data to learn patterns that enable the classification of new input data. Semi-supervised anomaly detection techniques, however, have little, if any, labeled data available (since virtually all of the data represents the normal class and anomalies are typically rare). Thus, it is difficult to design a semi-supervised anomaly detection system, and to measure the performance of such a semi-supervised anomaly detection system.

A need therefore exists for improved techniques for training and evaluating semi-supervised anomaly detection systems.

SUMMARY

Illustrative embodiments provide techniques for evaluating anomaly detection algorithms using impersonation data derived from user transaction data. In one embodiment, a method comprises obtaining transaction data of a given enterprise organization comprising transactions of a plurality of users; generating impersonation data by modifying one or more features of a subset of the transaction data of the given enterprise organization; classifying (i) at least a portion of the transaction data of the given enterprise organization, and (ii) at least a portion of the impersonation data using the anomaly detection algorithm of the given enterprise organization, wherein records of the impersonation data comprise a known classification; and evaluating a performance of the anomaly detection algorithm of the given enterprise organization by comparing the classification of records of the impersonation data by the anomaly detection algorithm with the known classification.

These and other illustrative embodiments disclosed herein include, without limitation, methods, apparatus, networks, systems and computer program products comprising processor-readable storage media.

BRIEF DESCRIPTION OF THE DRAWINGS

FIG. 2 illustrates a plurality of exemplary user transaction records, according to one embodiment of the disclosure;

FIG. 6 illustrates exemplary pseudo code for a supervised learning layer process, according to an exemplary embodiment of the disclosure.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

The computer networks described herein comprise one or more "information processing systems" that may encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

In one or more embodiments, the transaction data of a user of an anomaly detection system, such as an enterprise organization user, is modified to generate impersonation events that can be used to evaluate the classification performance of the anomaly detection system. In at least some embodiments, the user transaction data is modified in a manner that simulates various classes of attacks. Generally, the disclosed performance evaluation techniques inject sampled transactions into the dataset, and automatically modify them to represent attack-scenarios of different types. For example, one modification changes the user identifiers, such that the user identifier (user-id) of an actual data element of a first user is modified to be the user identifier of a second user in a modified data record that has a known classification (false). The modified data record can then be processed by the anomaly detection system to assess the classification performance. As discussed hereinafter, in various embodiments, the disclosed techniques can be used to generate many impersonation events, covering a variety of predefined attack scenarios.

In at least one embodiment of the disclosure, the performance of an anomaly detection system is measured by generating impersonation data comprising labeled anomalies and using supervised methods (and its variety of tools) combined with anomaly detection. In this manner, the strengths of supervised methods are provided within an otherwise semi-supervised anomaly detection system.

As noted above, the impersonation data is generated by sampling previously encountered transactions, and modifying one or more features of the data (e.g., a user identifier). The impersonation data is then processed by the anomaly detection system to determine if the anomaly detection system can detect and properly classify the labeled impersonation data.

Figure 1:
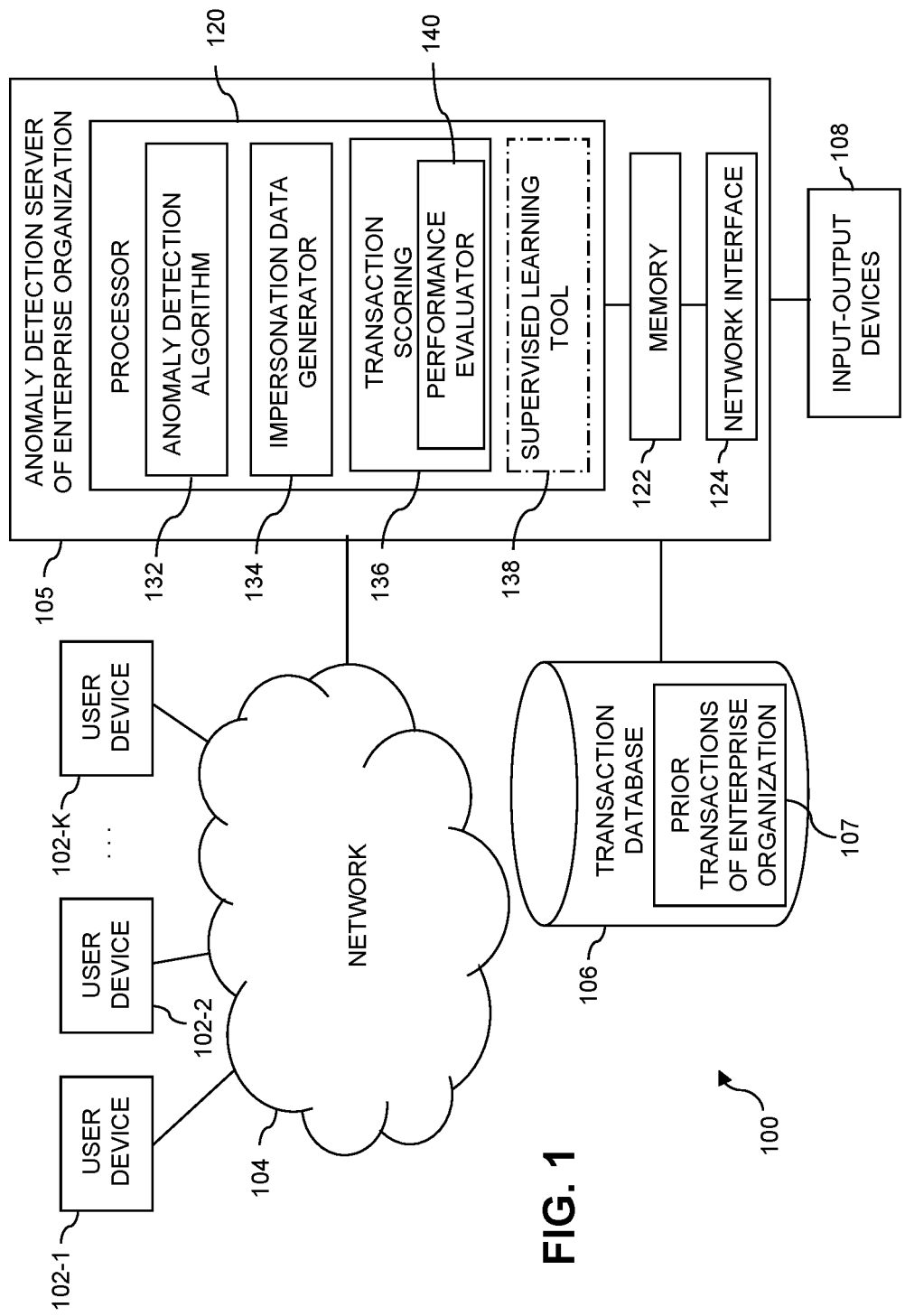
FIG. 1 is a block diagram of a computer network configured for evaluation of anomaly detection algorithms using impersonation data, in an illustrative embodiment.

FIG. 1 is a block diagram of a computer network 100 configured for evaluation of anomaly detection algorithms using impersonation data, in accordance with an illustrative embodiment of the invention. The exemplary computer network 100 is configured in at least one embodiment of the invention to train and evaluate semi-supervised anomaly detection systems. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

Also coupled to the network 104 is an anomaly detection server 105 of an enterprise organization or another entity that employs anomaly detection techniques. The anomaly detection server 105 is advantageously configured for training and evaluating semi-supervised anomaly detection systems. The anomaly detection server 105 has an associated transaction database 106 configured to store information relating to prior transactions 107 of the enterprise organization in the computer network 100. Other types of information that can be stored in the transaction database 106 as part of, or in conjunction with, the prior transactions 107 include network sessions data, login data or other types of data characterizing user access to protected resources within the computer network 100, as well as various combinations of multiple distinct types of such data. Network sessions data can include, for example, virtual private network (VPN) session data for VPN connections initiated within the computer network 100. Login data can include, for example, authentication data or other types of login data including timestamps and other information associated with login events. Numerous other types of information can be incorporated into the prior transactions 107 or otherwise stored in the transaction database 106.

The user devices 102 may comprise, for example, mobile telephones, laptop computers, tablet computers, desktop computers or other types of devices capable of communicating over the network 104, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Also associated with the anomaly detection server 105 are input-output devices 108, which illustratively comprise keyboards, displays or other types of input-output devices in any combination. Such input-output devices are used to support one or more user interfaces to the anomaly detection server 105, as well as to support communication between the anomaly detection server 105 and other related systems and devices not explicitly shown.

In one or more embodiments, login events initiated at respective ones of the user devices 102 are directed to the anomaly detection server 105 over the network 104 for processing. The anomaly detection server 105 determines if a given access attempt is authentic based on presentation of one or more predetermined authentication factors such as user identifiers, passwords or other factors. Upon verification of the presented authentication factors, the anomaly detection server 105 grants the requesting user device 102 access to one or more protected resources of the computer network 100. The anomaly detection server 105 in one or more embodiments can be implemented as a stand-alone server, set of servers or other type of authentication system coupled to the network 104.

The anomaly detection server 105 in the FIG. 1 embodiment is assumed to be implemented using at least one processing device. Each such processing device generally comprises at least one processor and an associated memory, and implements one or more functional modules for controlling certain features of the anomaly detection server 105.

More particularly, the anomaly detection server 105 in this embodiment comprises a processor 120 coupled to a memory 122 and a network interface 124.

The transaction database 106 in the present embodiment is illustratively implemented as part of one or more storage systems coupled to or otherwise associated with the anomaly detection server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other examples of particular types of storage that can be used in implementing a given storage system in an illustrative embodiment include storage arrays, flash storage, cloud storage, object-based storage, and scale-out NAS clusters. Combinations of multiple ones of these and other storage types can also be used in implementing a given storage system in an illustrative embodiment.

Although shown as being arranged externally to the anomaly detection server 105, the transaction database 106 in some embodiments can be at least in part internal to the anomaly detection server 105. For example, at least portions of the transaction database 106 can be implemented as an in-memory database utilizing the memory 122.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the anomaly detection server 105 to communicate over the network 104 with the user devices 102, and illustratively comprises one or more conventional transceivers.

The processor 120 also comprises an anomaly detection algorithm 132 that evaluates the risk of user transactions. The processor 120 further comprises a transaction scoring module 136. The transaction scoring module 136 utilizes a performance evaluator 140 and/or a supervised learning tool 138, in accordance with one embodiment of the disclosure.

The transaction scoring module 136 utilizes the prior transactions 107 stored in the transaction database 106 and the performance evaluator 140 to compute risk scores for new transactions. The performance evaluator 140 utilized in the transaction scoring module 136 can include different functions that are utilized to compute improved risk scores. One or more of the anomaly detection algorithm 132, the transaction scoring module 136, the performance evaluator 140 and the supervised learning tool 138, or portions thereof, can be implemented using the functions of the RSA SecurID® Suite for identity and access management, commercially available from RSA Security LLC and Dell EMC, of Hopkinton, Mass.

In addition, processor 120 comprises an impersonation data generator 134 that generates the impersonation data using the techniques described herein.

The arrangement described above advantageously permits the anomaly detection server 105 to automatically generate impersonation data and to evaluate the performance of the disclosed anomaly detection system. Accordingly, the limited resources of the anomaly detection server 105 available for attack detection and remediation can be more intelligently and effectively deployed in the computer network 100, resulting in improved performance as well as enhanced security against attacks.

At least portions of the anomaly detection algorithm 132, the transaction scoring module 136, the performance evaluator 140 and/or the supervised learning tool 138 may be implemented at least in part in the form of software that is stored in memory 122 and executed by processor 120. Similarly, at least portions of the anomaly detection server 105 can be implemented at least in part in the form of software that is stored in memory 122 and executed by processor 120.

It should also be understood that the particular set of elements shown in FIG. 1 for automatically generating impersonation data and evaluating the performance of the disclosed anomaly detection system is presented by way of illustrative example only, and in other embodiments additional or alternative elements may be used. Thus, another embodiment may include additional or alternative systems, devices and other network entities, as well as different arrangements of modules and other components.

By way of example, in other embodiments, one or more components of the anomaly detection server 105, such as transaction scoring module 136, can be implemented elsewhere in the computer network 100.

In some embodiments, the anomaly detection server 105 is a part of or otherwise associated with another system, such as, for example, a security operations center (SOC) or a critical incident response center (CIRC).

Additionally, or alternatively, the anomaly detection server 105 can be a part of, or incorporate, an otherwise conventional security analytics system, such as the RSA Security Analytics system commercially available from RSA, The Security Division of Dell EMC Corporation of Hopkinton, Mass.

Other embodiments can implement the anomaly detection server 105 as part of or in conjunction with a security information and event management (STEM) system, such as the enVision® platform, also commercially available from RSA. Such an STEM system is also considered another possible example of a network security system as that term is broadly used herein. In an embodiment of this type, at least portions of the prior transactions 107 stored in the transaction database 106 may comprise additional information derived from security logs collected by the STEM system.

FIG. 2 illustrates a plurality of exemplary user transaction records 200, according to one embodiment of the disclosure. As shown in FIG. 2, the exemplary user transaction records 200 are comprised of four real transactions performed by a given user (Alice) of the enterprise organization, and a fifth injected transaction using the data of another user (e.g., modifying the user-id and timestamp to resemble the given user, Alice). In this scenario, the anomaly detection system is expected to identify the injected impersonated transaction associated with the fifth record as suspicious, since the anomaly detection system has previously learned the behavior of the given user, Alice. Thus, facing a new transaction, which has the user-id of the given user, Alice, but none of her usual patterns (this is evaluated through a plurality of features in the risk engine of the anomaly detection system), the anomaly detection system should classify the fifth transaction as anomalous and mark it for further inspection.

Figure 3:
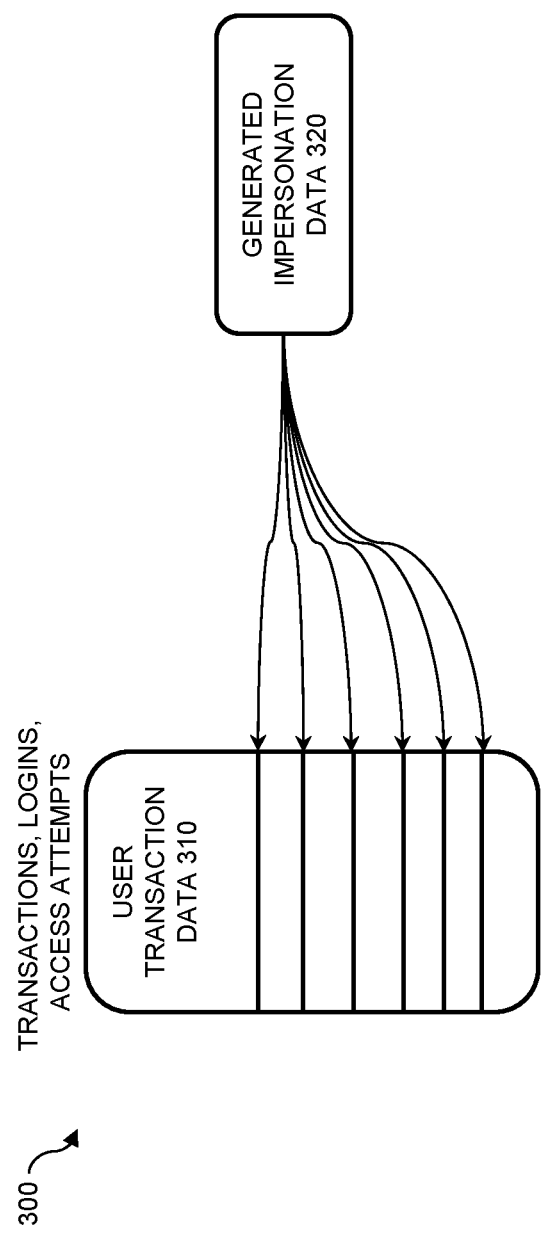
FIG. 3 illustrates an exemplary generation of a test data set comprised of user transaction data and impersonation data, according to an embodiment of the disclosure.

FIG. 3 illustrates an exemplary generation of a test data set 300 comprised of user transaction data 310 and impersonation data 320, according to an embodiment of the disclosure. The user transaction data 310 comprises, for example, transactions, login communications and access attempts. The technique for generating the impersonation data 320 is discussed further below in conjunction with FIG. 4. The generated impersonation data records 320 are injected into the original user transaction data 310. The impersonations were synthesized and are thus labeled (e.g., as false), which makes it easier to evaluate the performance of the anomaly detection system.

Figure 4:
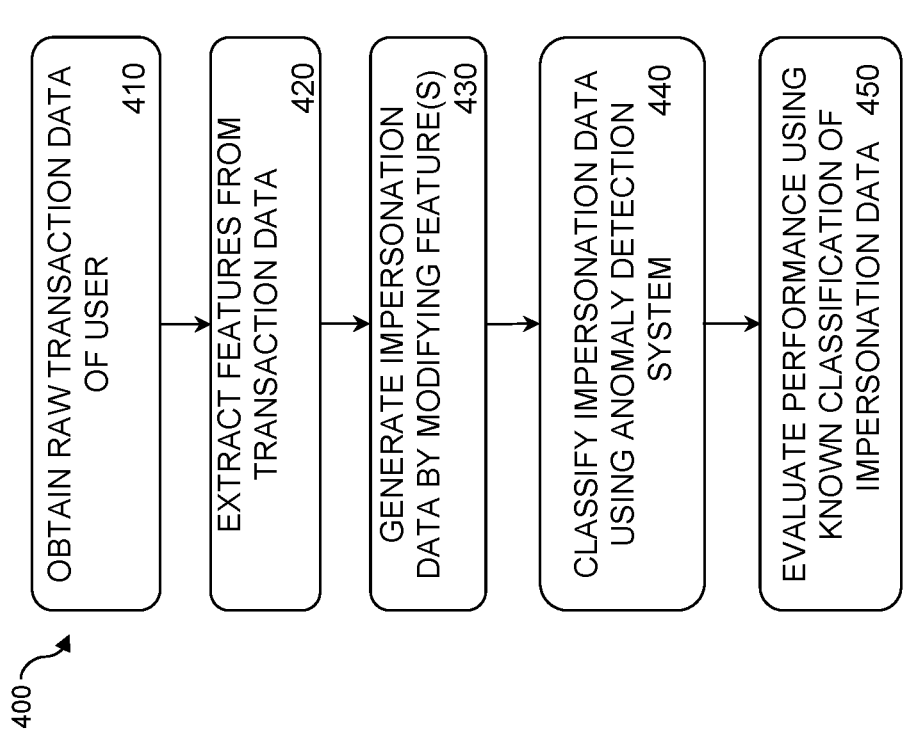
FIG. 4 is a flow chart illustrating an exemplary implementation of an impersonation data generation and evaluation process for evaluating anomaly detection systems, according to one embodiment of the disclosure.

FIG. 4 is a flow chart illustrating an exemplary implementation of an impersonation data generation and evaluation process 400 for evaluating anomaly detection systems, according to one embodiment of the disclosure. Generally, the exemplary impersonation data generation and evaluation process 400 performs a feature generation step to extract features from the user transaction data 310 of the enterprise organization, and generates impersonation events as impersonation data 320 by modifying one or more of the extracted features of the user transaction data 310. The resulting test data set 300 is then scored by an anomaly detection model and the performance metrics are calculated.

As shown in FIG. 4, the exemplary impersonation data generation and evaluation process 400 initially obtains the user transaction data 310 during step 410, and extracts features from the user transaction data 310 during step 420.

The impersonation data 320 is generated during step 430 by modifying one or more feature(s) of a subset of the user transaction data 310. For example, the modifications performed during step 430 may include changing one or more of the user identifier, date, time, and optionally, other features, as discussed further below.

Training and test data sets can then be generated from the test data set 300 (with the actual user transaction data 310 and the impersonation data 320 generated in step 430). Thereafter, the anomaly detection system can be trained using a subset of the test data set 300 (e.g., using a subset of the user transaction data 310 and a subset of the impersonation data 320).

The impersonation data 320 is then applied to the anomaly detection system and classified by the anomaly detection system during step 440, for example, based on a risk score. The performance of the anomaly detection system can then be evaluated during step 450 by comparing the classification of records of the impersonation data 320 by the anomaly detection algorithm with the known user transaction data 310.

Impersonation Generation

As noted above, impersonation events 320 are generated by modifying the sampled user transaction data 310 (e.g., during step 430) to realistically represent impersonations. In one exemplary implementation, the user identifier of the injected transaction is modified to be a different user (see, e.g., FIG. 2). For example, the system has transactions from users Alice and Bob. The user transaction data 310 for user Alice is then injected with a modified transaction of user Bob (for example, with the user identifier modified to specify user Alice), thus creating an impersonation (Bob trying to look like Alice). In this case, the anomaly detection system would have already seen several of Alice's own, original transactions. The injected impersonation transaction, however, will not match Alice's usual patterns. In such cases, the system should flag the injection as an impersonation event. Repeating the process automatically, creating many impersonation events, helps to establish the performance of the anomaly detection system, for example, using the exemplary impersonation data generation and evaluation process 400 of FIG. 4.

In further variations, multiple predefined attack scenarios can be generate generated, such as "stolen device," or "stolen credentials," by manipulating the raw user transaction data of the injected impersonation data. For example, to apply a "stolen device" scenario, one of Alice's original transactions can be injected, but with the location changed, since the device was stolen and probably not used from Alice's office. The injections of impersonation data are designed per specific scenarios (e.g., consulting with subject matter experts) to provide wide coverage of each scenario. The injection process is then automated, and allows high volumes of impersonations to be generated, to test the anomaly detection system in a robust manner.

In order to avoid creating impersonation data records with a high bias, one or more embodiments of the disclosure utilizes the customer's own transaction data to make the modifications required to produce the injections. For example, a new location is not selected a-priori from a predefined list. Instead, a location is sampled, based on the users and their peers. In the "stolen credentials" scenario, this would be a different location than Alice's usual locations, or even a nearby location, which can be generated, based on Alice's actual transaction data. This provides the ability to define the attack scenario abstractly, yet make it realistic. The injection process then uses real, plausible data, to carry out the scenario requirements.

One or more embodiments of the disclosed method enhances the ability to test the anomaly detection system under various plausible conditions, and increase the confidence in the ability of the anomaly detection system to detect impersonations in a variety of scenarios. One or more embodiments of the disclosed method also provides a tool to define scenarios in an abstract manner, and to test the defined scenarios. As noted above, the scenarios are optionally designed using the help of Subject Matter Experts (SMEs), ultimately providing a large coverage of these scenarios.

In one exemplary implementation, the anomaly detection system is embodied as the RSA SecurID® Suite for identity and access management, commercially available from RSA Security LLC and Dell EMC, of Hopkinton, Mass. Using the disclosed method, the performance of the system can be routinely tested using, for example, a False-Acceptance rate (FAR) and a False-Rejection rate (FRR). In further variations, receiver operating characteristics (ROC) and/or a confusion matrix is/are evaluated. Generally, an FAR means the ratio of missed impersonations, and the FRR is the rate of genuine users being challenged by the system. Formally, the definitions are:

$$FAR = \frac{\text{False-Negatives}}{(\text{False-Negatives}) + (\text{True-Positives})}; \text{ and}$$

$$FRR = \frac{\text{False-Positive}}{(\text{False-Positive}) + (\text{True-Negative})}$$

The RSA SecurID® Suite for identity and access management calculates a risk-score per transaction, where a high risk score means a probable impersonation. The FAR and FRR can then be evaluated based on different score-thresholds. Such a calculation is possible because the impersonation was created, while also creating the labels (e.g., a false event). Generally, good results typically have a low FAR and FRR, meaning that detecting most impersonations (FAR) would have a low impact on the general, genuine population (FRR).

Figure 5:
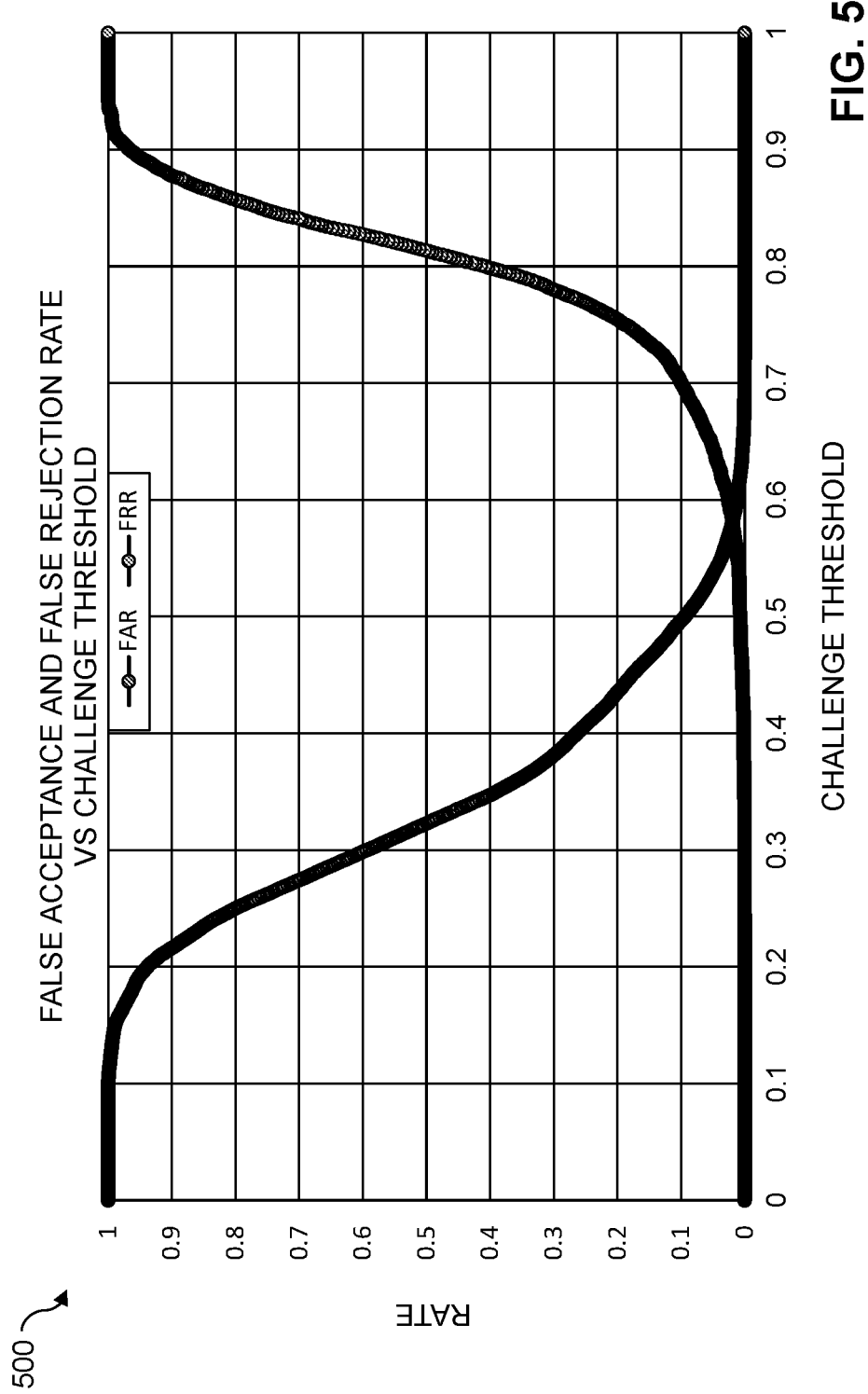
FIG. 5 illustrates exemplary techniques for evaluating the performance of an anomaly detection system using impersonation data, according to one embodiment of the disclosure.

FIG. 5 illustrates exemplary FAR and FRR techniques 500 for evaluating the performance of an anomaly detection system using injected impersonation data, according to one embodiment of the disclosure. The challenge threshold indicates the score above which the user is challenged (e.g., using second authentication methods, such as out-of-band SMS (Short Message Service) or email). The left side of FIG. 5 has a challenge threshold of 0, effectively challenging all users, while the right side of FIG. 5 has a challenge threshold of 1, meaning challenge no one.

FIG. 5 provides a mechanism for communicating to the customer their assurance level, provided the challenge rate of the population. For a certain level of user assurance (low FAR), the customer will have to challenge a certain percentage of the population (FRR). In this manner, the customer's overall coverage, or regard to specific scenarios, can also be communicated, as well as locating gaps.

Supervised Learning and Semi-Supervised Anomaly Detection

As noted above, in at least one embodiment of the disclosure, the performance of an anomaly detection system is measured by generating impersonation data comprising labeled anomalies and using supervised methods combined with anomaly detection. In this manner, the strengths of supervised methods are provided within an otherwise semi-supervised anomaly detection system.

Thus, in one or more embodiments, a supervised-learning layer is added to the anomaly-detection layer. This is a separate significant improvement to the semi-supervised anomaly detection algorithms. With abundant labeled data provided by the impersonation data 320, the anomaly detection capability is combined with supervised methods, such as Decision Trees (DT), Logistic Regression, and others. These supervised algorithms can detect features or patterns that correspond strongly to an impersonation attempt (this is done by calculating the performance of the algorithm). For example, a "device age" is expected to be such a feature, since new devices highly correlate with impersonations. Decision Trees can detect such features, or even combination of features, so that out of N features, d features may work well within the supervised algorithm.

FIG. 6 illustrates exemplary pseudo code 600 for a supervised learning layer process, according to an exemplary embodiment of the disclosure. As shown in FIG. 6, a supervised-learning layer is added to the anomaly-detection layer, as follows:

1. Apply appropriate supervised learning algorithm to the dataset;
2. Detect d features work well with the supervised algorithm;
3. Use the supervised algorithm to classify a new test-dataset (benign or impersonation), using the detected d features;
4. Challenge any transaction that was predicted to be an impersonation;
5. Evaluate all other transactions (predicted benign) using the score of the anomaly detection engine; and
6. Challenge the top riskiest (e.g., Top N scores) transactions based on anomaly detection score It has been found that a combination of SecurID with Decision Trees significantly improved the results over the unaided anomaly detection method.

CONCLUSION

Generally, in the context of Identity Access and Management (IAM), semi-supervised anomaly detection has been integrated with supervised algorithms. The created impersonation approach can be generally applied in the field of IAM, or in other products, such as NetWitness, as would be apparent to a person of ordinary skill in the art. The combination of supervised and semi-supervised anomaly detection can greatly boost the performance of both, as the supervised learning is used to detect the "obvious" strong features, while the anomaly detection can be used to check for more subtle features, that weren't covered by the supervised algorithm.

The above-described illustrative embodiments provide significant advantages relative to conventional approaches. Among other benefits, one or more embodiments of the disclosed techniques for training and evaluating semi-supervised anomaly detection systems detect anomalies between users, even if they are similar users (for example, in the same department). Non-identical users should be detected with anomaly detection.

In one or more embodiments, the disclosed impersonation generation method is generic, and labeled impersonation injections can be applied using any groups, including (but not limited to) a kNN method. For example, users can be injected from the same department of a given user, to make sure that the algorithm can differentiate between the given user and her or his colleagues.

The training and evaluating of anomaly detection systems can optionally be used in tandem with supervised methods, to boost the anomaly detection algorithm.

The exemplary disclosed impersonation generation methods draws samples from the existing transaction dataset, and injects the existing transaction dataset with modified versions of the existing transaction data. In one or more embodiments, the exemplary algorithm provides scoring only for each injected transaction, but the injections are excluded from updating the model. Thus, the distribution of the original dataset is not changed.

Any number of labeled impersonation data records can be generated, in a scalable and easy fashion. Thus, performance of the anomaly detection system can be quickly measured.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRail™, VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, features, risk scores, and other components and parameters can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method, comprising:
  obtaining transaction data of a given enterprise organization comprising transactions of a plurality of users, wherein the transaction data comprises one or more of online transactions, login communications and attempts to access protected resources;
  extracting one or more features from at least a subset of the transaction data of the given enterprise organization;
  generating impersonation data by modifying one or more of the extracted features of the subset of the transaction data of the given enterprise organization from a first value for a given feature to a second value for the given feature to simulate a plurality of attack classes, wherein the extracted features of the transaction data that are modified are defined for each simulated attack class, wherein the generating the impersonation data comprises modifying a feature value of one or more of a user identifier feature and a location feature of a given transaction of a given user from the transaction data to a different feature value from the transaction data;
  classifying, using at least one processing device, (i) at least a portion of the transaction data of the given enterprise organization, and (ii) at least a portion of the impersonation data, using an anomaly detection algorithm of the given enterprise organization, wherein records of the impersonation data comprise a known classification;
  evaluating, using the at least one processing device, a performance of the anomaly detection algorithm of the given enterprise organization to identify at least one anomaly by comparing the classification of records of the impersonation data by the anomaly detection algorithm with the known classification for at least one of the plurality of simulated attack classes; and
  initiating one or more remedial actions in response to the identified at least one anomaly.

2. The method of claim 1, wherein the features of the transaction data that are modified are selected to simulate a given predefined attack scenario.

3. The method of claim 1, wherein one or more modified features of a given impersonation record are based on the transaction data of one or more of the plurality of users of the given enterprise organization.

4. The method of claim 1, wherein the evaluating comprises determining a risk score for one or more records in the impersonation data.

5. The method of claim 1, further comprising the step of training the anomaly detection algorithm of the given enterprise organization using a different subset of the transaction data of the given enterprise organization.

6. The method of claim 1, wherein the anomaly detection algorithm further comprises a supervised learning method that uses the known classification of the impersonation data to detect one or more of at least one feature and at least one pattern that corresponds to an impersonation attempt.

7. The method of claim 1, wherein the known classification in the impersonation data provides an indication that the impersonation data corresponds to a false event.

8. A computer program product, comprising a non-transitory machine-readable storage medium having encoded therein executable code of one or more software programs, wherein the one or more software programs when executed by at least one processing device perform the following steps:
  obtaining transaction data of a given enterprise organization comprising transactions of a plurality of users, wherein the transaction data comprises one or more of online transactions, login communications and attempts to access protected resources;
  extracting one or more features from at least a subset of the transaction data of the given enterprise organization;
  generating impersonation data by modifying one or more of the extracted features of the subset of the transaction data of the given enterprise organization from a first value for a given feature to a second value for the given feature to simulate a plurality of attack classes, wherein the extracted features of the transaction data that are modified are defined for each simulated attack class, wherein the generating the impersonation data comprises modifying a feature value of one or more of a user identifier feature and a location feature of a given transaction of a given user from the transaction data to a different feature value from the transaction data;

classifying, using the at least one processing device, (i) at least a portion of the transaction data of the given enterprise organization, and (ii) at least a portion of the impersonation data, using an anomaly detection algorithm of the given enterprise organization, wherein records of the impersonation data comprise a known classification;

evaluating, using the at least one processing device, a performance of the anomaly detection algorithm of the given enterprise organization to identify at least one anomaly by comparing the classification of records of the impersonation data by the anomaly detection algorithm with the known classification for at least one of the plurality of simulated attack classes; and initiating one or more remedial actions in response to the identified at least one anomaly.

9. The computer program product of claim 8, wherein the features of the transaction data that are modified are selected to simulate a given predefined attack scenario.

10. The computer program product of claim 8, wherein one or more modified features of a given impersonation record are based on the transaction data of one or more of the plurality of users of the given enterprise organization.

11. The computer program product of claim 8, wherein the anomaly detection algorithm further comprises a supervised learning method that uses the known classification of the impersonation data to detect one or more of at least one feature and at least one pattern that corresponds to an impersonation attempt.

12. The computer program product of claim 8, wherein the known classification in the impersonation data provides an indication that the impersonation data corresponds to a false event.

13. An apparatus, comprising:
a memory; and
at least one processing device, coupled to the memory, operative to implement the following steps:
obtaining transaction data of a given enterprise organization comprising transactions of a plurality of users, wherein the transaction data comprises one or more of online transactions, login communications and attempts to access protected resources;
extracting one or more features from at least a subset of the transaction data of the given enterprise organization;
generating impersonation data by modifying one or more of the extracted features of the subset of the transaction data of the given enterprise organization from a first value for a given feature to a second value for the given feature to simulate a plurality of attack classes, wherein the extracted features of the transaction data that are modified are defined for each simulated attack class, wherein the generating the impersonation data comprises modifying a feature value of one or more of a user identifier feature and a location feature of a given transaction of a given user from the transaction data to a different feature value from the transaction data;

classifying, using the at least one processing device, (i) at least a portion of the transaction data of the given enterprise organization, and (ii) at least a portion of the impersonation data, using an anomaly detection algorithm of the given enterprise organization, wherein records of the impersonation data comprise a known classification;

evaluating, using the at least one processing device, a performance of the anomaly detection algorithm of the given enterprise organization to identify at least one anomaly by comparing the classification of records of the impersonation data by the anomaly detection algorithm with the known classification for at least one of the plurality of simulated attack classes; and initiating one or more remedial actions in response to the identified at least one anomaly.

14. The apparatus of claim 13, wherein the features of the transaction data that are modified are selected to simulate a given predefined attack scenario.

15. The apparatus of claim 13, wherein one or more modified features of a given impersonation record are based on the transaction data of one or more of the plurality of users of the given enterprise organization.

16. The apparatus of claim 13, wherein the evaluating comprises determining a risk score for one or more records in the impersonation data.

17. The apparatus of claim 13, further comprising the step of training the anomaly detection algorithm of the given enterprise organization using a different subset of the transaction data of the given enterprise organization.

18. The apparatus of claim 13, wherein the anomaly detection algorithm further comprises a supervised learning method that uses the known classification of the impersonation data to detect one or more of at least one feature and at least one pattern that corresponds to an impersonation attempt.

19. The computer program product of claim 8, further comprising training the anomaly detection algorithm of the given enterprise organization using a different subset of the transaction data of the given enterprise organization.

20. The apparatus of claim 13, wherein the known classification in the impersonation data provides an indication that the impersonation data corresponds to a false event.

\* \* \* \* \*